(No Model.)
E. L. BROWN.
BALL BEARING FOR VEHICLES.
No. 527,659. Patented Oct. 16, 1894.
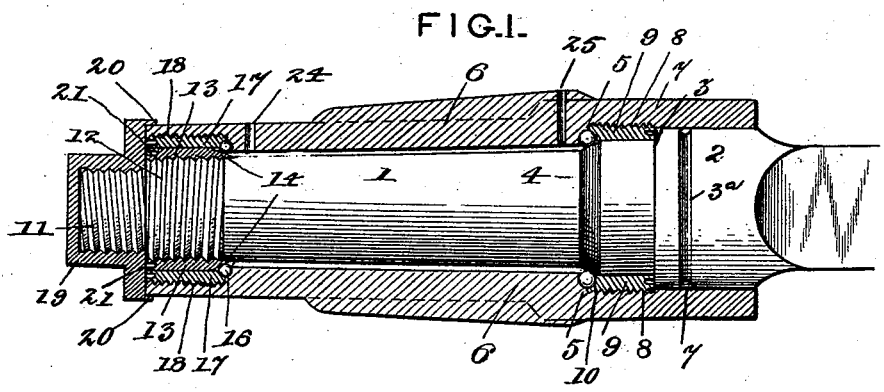
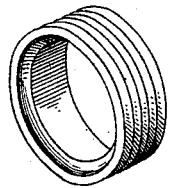
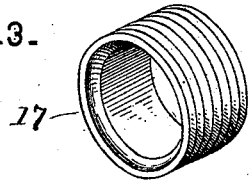
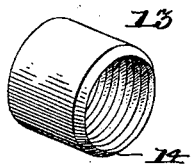
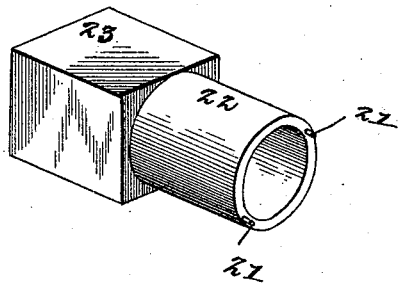
Inventor
Edward L. Brown
Witnesses
E. H. Monroe
H. T. Riley
By his Attorneys.
C. A. Snow & Co.

UNITED STATES PATENT OFFICE.

EDWARD L. BROWN, OF SPOTTSWOOD, VIRGINIA.

BALL-BEARING FOR VEHICLES.

SPECIFICATION forming part of Letters Patent No. 527,659, dated October 16, 1894.

Application filed July 11, 1894. Serial No. 517,188. (No model.)

*To all whom it may concern:*

Be it known that I, EDWARD L. BROWN, a citizen of the United States, residing at Spottswood, in the county of Augusta and State of Virginia, have invented a new and useful Ball-Bearing for Vehicles, of which the following is a specification.

The invention relates to improvements in ball-bearings for vehicles.

The object of the present invention is to improve the construction of ball-bearings for vehicles, and to enable the same to be readily adjusted to take up the wear, and to provide one which will reduce the friction to a minimum.

A further object of the invention is to enable a lubricant to be readily supplied to the axle when desired.

The invention consists in the construction and novel combination and arrangement of parts hereinafter fully described, illustrated in the accompanying drawings, and pointed out in the claims hereto appended.

In the drawings: Figure 1 is a central longitudinal sectional view of an axle and axle-box, provided with ball-bearings constructed in accordance with this invention. Fig. 2 is a detail perspective view of the inner collar. Fig. 3 is a similar view of the outer collar. Fig. 4 is a detail perspective view of the adjusting nut or ring. Fig. 5 is a detail perspective view of the tool for rotating the adjusting collar or ring.

Like numerals of reference indicate corresponding parts in all the figures of the drawings.

1 designates a spindle of an axle, provided at its inner end with a cylindrical extension 2, and having an annular shoulder 3, and a dust receiving groove $3^a$ and provided a short distance therefrom, and beyond the same, with an annular beveled portion 4, adapted to receive balls 5, which are interposed between the spindle and an axle-box 6. The axle-box is provided at its inner end with an annular recess 7. Its inner terminal extends over the cylindrical extension 2 of the spindle to make the bearing dust-proof; and it is provided, at the inner terminus of its annular recess 7, with a threaded portion 8, receiving an exteriorly-threaded collar 9. The collar is provided adjacent to the balls 5, with a groove 10, and the adjacent edge of the shoulder of the axle-box is provided with a similar groove. The threaded collar is adapted to be adjusted to take up any wear. The outer end of the spindle is provided with the usual reduced threaded portion 11, and it has an oppositely-threaded portion 12 adjacent to the reduced portion 11; and mounted on the threaded portion 12 is an interiorly threaded ring 13, which is provided, at its inner end, with an annular bevel 14, receiving balls 16. The balls 16 are arranged on the beveled portion 14 and are interposed between the same and the axle-box, and an outer collar 17, the collar and the axle-box being provided with grooves to receive the balls. The collar is exteriorly threaded and is arranged in an interiorly-threaded annular recess 18 at the outer extremity of the axle-box. The reduced portion of the spindle receives an axle-nut 19, which is provided with a flange 20, which fits over the outer terminus of the axle-box.

The ring 13 is provided, at its outer edge, with opposite sockets, adapted to receive projections 21, of a sleeve 22, of a size to fit over the reduced threaded portion 11 of the spindle, and provided with a solid polygonal wrench-receiving portion 23, whereby the ring 13 may be readily adjusted to take up the wear. The inner and outer collars are also provided with similar sockets to be engaged by a suitable tool.

The parts are constructed of suitable metal, preferably steel, and the axle-box is provided, adjacent to its ends, with oil-holes adapted to receive oil-tubes 24 and 25, designed to extend through the hub of a wheel.

The axle-box is provided with the usual flanges, whereby it is rigidly secured within a hub.

It will be seen that the ball-bearing is simple and comparatively inexpensive in construction, that it reduces friction to a minimum, and that wear may be readily taken up.

Changes in the form, proportion, and minor details of construction may be resorted to without departing from the principle or sacrificing any of the advantages of this invention.

What I claim is—

1. The combination of a spindle provided with a shoulder and having, in advance of the same, an annular beveled portion, an axle-box provided at its inner end with an annular recess and having the inner terminus thereof threaded and provided with an annular groove located opposite the annular beveled portion, a threaded collar arranged in the threaded portion of said recess and provided at its inner edge with an annular groove arranged opposite that of the axle-box, and balls arranged in the grooves and located on the beveled portion of the spindle, substantially as described.

2. The combination of a spindle having a reduced threaded portion and an oppositely-threaded portion adjacent to the reduced portion, an axle-box provided at its outer end with an interiorly-threaded annular recess and having an annular groove at the inner edge of the shoulder formed by the recess, an outer threaded collar arranged in the recess of the axle-box and provided at its inner end with a groove located adjacent to the said groove, an adjustable ring interiorly threaded and mounted on the threaded portion 12 of the spindle and having its inner edge beveled, and balls arranged on the beveled portion of the nut and located in the grooves of the axle-box and the collar, substantially as described.

3. The combination of a spindle having an inner cylindrical extension and provided with a shoulder and having in advance of the same an annular beveled portion, said spindle being provided adjacent to its reduced outer terminal with an oppositely-threaded portion 12, an axle-box provided at its inner and outer ends with annular recesses interiorly threaded adjacent to the shoulders formed thereby and provided at the inner edges of the shoulders with annular grooves, the inner end of the axle-box being extended over the cylindrical extension of the spindle, the inner and outer exteriorly-threaded collars arranged in the recesses of the axle-box and provided at their inner edges with annular grooves located opposite the grooves of the axle-box, an adjusting ring interiorly threaded and arranged on the threaded portion of the spindle and having its inner edge beveled, and balls arranged on the beveled portions of the spindle and the ring and located in said grooves, substantially as described.

In testimony that I claim the foregoing as my own I have hereto affixed my signature in the presence of two witnesses.

EDWARD L. BROWN.

Witnesses:
E. M. CUSHING,
T. A. PACE.